(12) United States Patent
Zhu et al.

(10) Patent No.: US 12,259,462 B2
(45) Date of Patent: Mar. 25, 2025

(54) RANGING METHOD, RANGING DEVICE AND RANGING SYSTEM

(71) Applicant: HANGZHOU HIKVISION DIGITAL TECHNOLOGY CO., LTD., Hangzhou (CN)

(72) Inventors: Yushi Zhu, Hangzhou (CN); Jie Sun, Hangzhou (CN)

(73) Assignee: HANGZHOU HIKVISION DIGITAL TECHNOLOGY CO., LTD., Zhejiang (CN)

(*) Notice: Subject to any disclaimer, the term of this patent is extended or adjusted under 35 U.S.C. 154(b) by 691 days.

(21) Appl. No.: 17/251,599

(22) PCT Filed: Jun. 14, 2019

(86) PCT No.: PCT/CN2019/091334
§ 371 (c)(1),
(2) Date: Dec. 11, 2020

(87) PCT Pub. No.: WO2019/238127
PCT Pub. Date: Dec. 19, 2019

(65) Prior Publication Data
US 2021/0270957 A1    Sep. 2, 2021

(30) Foreign Application Priority Data
Jun. 15, 2018    (CN) .......................... 201810623786.0

(51) Int. Cl.
*G01S 13/86*    (2006.01)
*G01S 13/08*    (2006.01)
(Continued)

(52) U.S. Cl.
CPC ............ *G01S 13/867* (2013.01); *G01S 13/08* (2013.01); *G06T 7/50* (2017.01); *G06T 7/70* (2017.01);
(Continued)

(58) Field of Classification Search
CPC ...... G01S 13/867; G01S 13/08; G01S 13/931; G06T 7/50; G06T 7/70; G06T 2207/10016; G06T 2207/10044; G06T 2207/30261
See application file for complete search history.

(56) References Cited

U.S. PATENT DOCUMENTS 9,436,877 B2 * 9/2016 Edmondson .............. G06T 7/20
10,967,824 B1 * 4/2021 Pertsel .............. B60R 21/01538
(Continued)

FOREIGN PATENT DOCUMENTS

CN      1813168      8/2006
CN     102303605     1/2012
(Continued)

OTHER PUBLICATIONS

International Search Report in International Application No. PCT/CN2019/091,334, dated Sep. 24, 2019, 6 pages (With English Translation).
(Continued)

*Primary Examiner* — Timothy A Brainard
*Assistant Examiner* — Kenneth W Good
(74) *Attorney, Agent, or Firm* — Fish & Richardson P.C.

(57) ABSTRACT

The present disclosure provides a ranging method, a ranging device, and a ranging system. The method includes: acquiring a video image and a radar signal set that are collected respectively by a camera and radar at the same time; determining position information corresponding to each target object in the video image; determining one or more target object that have matched a radar signal in the video image; determining a ranging algorithm based on the position information corresponding to the target objects that have matched radar signals and the radar signals matching the target objects; and calculating a distance between a target
(Continued)

object that does not match a radar signal in the video image and a designated vehicle according to position information corresponding to the target object that does not match a radar signal in the video image and through the ranging algorithm.

17 Claims, 4 Drawing Sheets

(51) Int. Cl.
  *G01S 13/931* (2020.01)
  *G06T 7/50* (2017.01)
  *G06T 7/70* (2017.01)

(52) U.S. Cl.
  CPC ... *G01S 13/931* (2013.01); *G06T 2207/10016* (2013.01); *G06T 2207/10044* (2013.01); *G06T 2207/30261* (2013.01)

(56) References Cited

U.S. PATENT DOCUMENTS

| | | | | |
|---|---|---|---|---|
| 11,145,146 | B2 * | 10/2021 | Mercep | B60W 50/0225 |
| 11,719,788 | B2 * | 8/2023 | Motoyama | G01C 3/08 |
| | | | | 342/55 |
| 2003/0160866 | A1 | 8/2003 | Hori et al. | |
| 2005/0225479 | A1 | 10/2005 | Shirai | |
| 2006/0072914 | A1 | 4/2006 | Kazuhiko et al. | |
| 2006/0140449 | A1 | 6/2006 | Otsuka et al. | |
| 2007/0171121 | A1 | 7/2007 | Munakata | |
| 2016/0349356 | A1 | 12/2016 | Takaki | |
| 2018/0218228 | A1 * | 8/2018 | Takaki | G06V 20/58 |
| 2018/0341007 | A1 * | 11/2018 | Fetterman | G01S 7/4972 |
| 2019/0120955 | A1 * | 4/2019 | Zhong | G01S 13/931 |
| 2019/0340775 | A1 * | 11/2019 | Lee | G05D 1/024 |
| 2020/0211226 | A1 * | 7/2020 | Kundu | G06V 20/582 |
| 2021/0055406 | A1 * | 2/2021 | Koyama | G01S 13/931 |

FOREIGN PATENT DOCUMENTS

| | | |
|---|---|---|
| CN | 102661733 | 9/2012 |
| CN | 106168664 | 11/2016 |
| CN | 106168664 A | 11/2016 |
| CN | 106291523 | 1/2017 |
| CN | 106291523 A | 1/2017 |
| CN | 107238834 | 10/2017 |
| CN | 107238834 A | 10/2017 |
| CN | 206710598 | 12/2017 |
| CN | 107831777 | 3/2018 |
| DE | 10305935 | 8/2004 |
| JP | 2002098754 | 4/2002 |
| JP | 2006048435 | 2/2006 |

OTHER PUBLICATIONS

Luo et al., "Unified calibration method for millimeter-wave radar and camera", JTsinghuaUniv(Sci& Technol), vol. 54,No. 3, ISSN1000-0054, CN11-2223/N, 2014, 5 pages (With English Abstract).
Wang, "Study on Detection of Ahead Vehicle Based on Millimeter-Wave Radar-vision" Jilin University, Jun. 2013, 81 pages (With English Abstract).
Zhang, "A Flexible New technique for Camera Calibration", IEEE Transactions on Pattern Analysis and Machine Intelligence, vol. 22, No. 11, Nov. 2000, 5 pages.
CN Office Action issued in Chinese Application No. 201810623786.0 on Apr. 27, 2021, 16 pages (with English translation).
Extended European Search Report issued in European Application No. 19819789.9 on Jun. 1, 2021, 12 pages.
Han et al., "Vehicle distance estimation using a mono-camera for FCW/AEB systems," International Journal of Automotive Technology, the Korean Society of Automotive Engineers, Heidelberg, vol. 17, No. 3, Apr. 30, 2016, 9 pages.
PCT International Search Report and Written Opinion issued in International Application No. PCT/CN2019/091334 on Sep. 24, 2019, 9 pages (with English translation).
Radar Monocular et al, "Distance Estimation by Fusing Radar and Monocular Camera with Kalman Filter", SAE Intelligent and Connected Vehicles Symposium SAE International, SAE Intelligent and Connected Vehicle Symposium 2017, Sep. 23, 2017, 10 pages.

* cited by examiner

RANGING METHOD, RANGING DEVICE AND RANGING SYSTEM

CROSS-REFERENCE TO RELATED APPLICATIONS

The present application is a national phase application based on International Patent Application Serial No. PCT/CN2019/091334 filed on Jun. 14, 2019. International Patent Application Serial No. PCT/CN2019/091334 claims priority to Chinese Patent Application No. 201810623786.0 filed on Jun. 15, 2018. The entire contents of each of the referenced applications are incorporated herein by reference for all purposes.

TECHNICAL FIELD

The present disclosure relates to the field of machine vision technology, and in particular, to a ranging method, a ranging device, and a ranging system.

BACKGROUND

A front vehicle detection system can detect a distance between a front vehicle and this vehicle. When the distance is too small, a warning signal is issued in time to remind the driver to take avoidance measures.

The front vehicle detection system can employ the following two vehicle ranging methods. The first method is to achieve vehicle ranging based on a vehicle-mounted millimeter-wave radar. In this method, the vehicle-mounted millimeter-wave radar can directly detect information such as the distance, speed, and orientation of the radar target. However, the detection range of the radar is limited, and the radar signal is susceptible to interference, so it is easy to cause missed detection and false detection of a front vehicle. The second method is to implement vehicle ranging based on machine vision technology. In this method, an image of the road is collected by a camera to extract position information of a front vehicle in the image of the road. Based on the position information, distance information of the front vehicle is determined by means of a distance calculation model. However, distance calculation models are mostly implemented based on hypothetical ideal situations. When the actual road situation deviates from the ideal situation, the accuracy of vehicle ranging will be greatly affected.

SUMMARY

The present disclosure provides a ranging method, a ranging device, and a ranging system, in order to achieve a more comprehensive and accurate measurement of a distance between a vehicle and a front obstacle.

According to a first aspect of the examples of the present disclosure, a ranging method is provided. The method includes:

acquiring a video image and a radar signal set that are collected respectively by a camera and radar at the same time;

determining position information corresponding to each target object in the video image;

determining one or more target objects that have matched radar signals in the video image;

determining a ranging algorithm based on the position information corresponding to the target objects that have matched radar signals and the radar signals matching the target objects; and calculating a distance between a target object that does not match a radar signal in the video image and a designated vehicle according to position information corresponding to the target object that does not match a radar signal in the video image and through the ranging algorithm.

Optionally, the position information corresponding to the target object includes a Y-axis coordinate value of the target object in an image coordinate system of the video image.

Optionally, a video area of the target object in the video image overlaps with a projection area of a radar target corresponding to a radar signal matching the target object in the video image.

Optionally, determining a ranging algorithm based on the position information corresponding to the target objects that have matched radar signals and the radar signals matching the target objects includes:

establishing a model parameter set with the position information corresponding to the target objects that have matched radar signals in the video image and the radar signals matching the target objects; and determining a monocular ranging model from the model parameter set and previously calibrated configuration parameters of the camera, wherein the monocular ranging model takes position information corresponding to a target object as an input, and a distances between the target object and the designated vehicle as an output.

Optionally, establishing a model parameter set with the position information corresponding to the target objects that have matched radar signals in the video image and the radar signals matching the target objects includes:

determining a confidence level of a radar signal matching each target object that has matched a radar signal in the video image; and adding position information corresponding to each target object that has matched a radar signal, distance information in the matching radar signal, and the confidence level of the matching radar signal as a group of model parameters to the model parameter set.

Optionally, determining a monocular ranging model from the model parameter set and previously calibrated configuration parameters of the camera includes:

fitting a pitch angle of a road with each group of model parameters in the model parameter set; and determining a monocular ranging model with the pitch angle of the road and previously calibrated configuration parameters of the camera.

Optionally, before determining a monocular ranging model from the model parameter set and previously calibrated configuration parameters of the camera, the method further includes:

deciding whether a number of groups of model parameters in the model parameter set is less than a preset threshold; and adding preset model parameters to the model parameter set when the number of groups of model parameters in the model parameter set is less than the preset threshold.

According to a second aspect of the examples of the present disclosure, a ranging device is provided. The device includes:

an acquisition module configured to acquire a video image and a radar signal set that are collected respectively by a camera and radar at the same time;

a position determining module configured to determine position information corresponding to each target object in the video image;

an algorithm determining module configured to determine one or more target objects that have matched radar signals in the video image, and determine a ranging algorithm based on the position information corresponding to the target objects that have matched radar signals and the radar signals matching the target objects; and a calculation module configured to calculate a distance between a target object that does not match a radar signal in the video image and a designated vehicle according to position information corresponding to the target object that does not match a radar signal in the video image and through the ranging algorithm.

Optionally, the position information corresponding to the target object includes a Y-axis coordinate value of the target object in an image coordinate system of the video image.

Optionally, a video area of the target object in the video image overlaps with a projection area of a radar target corresponding to a radar signal matching the target object in the video image.

Optionally, the algorithm determining module includes:
an establishing sub-module configured to establish a model parameter set with position information corresponding to the target objects that have matched radar signals in the video image and the radar signals matching the target objects; and
a processing sub-module configured to determine a monocular ranging model from the model parameter set and previously calibrated configuration parameters of the camera, wherein the monocular ranging model takes position information corresponding to a target object as an input, and a distance between the target object and the designated vehicle as an output.

Optionally, the establishing sub-module includes:
a confidence determining sub-module configured to determine a confidence level of a radar signal matching each target object that has matched a radar signal in the video image; and
an adding sub-module configured to add position information corresponding to each target object that has matched a radar signal, distance information in the matching radar signal, and the confidence level of the matching radar signal as a group of model parameters to the model parameter set.

Optionally, the processing sub-module includes:
a pitch angle fitting sub-module configured to fit a pitch angle of a road with each group of model parameters in the model parameter set; and
a model determining sub-module configured to determine a monocular ranging model with the pitch angle of the road and previously calibrated configuration parameters of the camera.

Optionally, the device further includes:
a deciding module configured to decide whether a number of groups of model parameters in the model parameter set is less than a preset threshold; and
an additional module configured to add preset model parameters to the model parameter set when the number of groups of model parameters in the model parameter set is less than the preset threshold.

According to a third aspect of the examples of the present disclosure, a ranging system is provided. The system includes:
a radar configured to collect radar signal sets;
a camera configured to collect a video image;
a storage medium configured to store a computer program; and a processor configured to execute the computer program stored on the storage medium to implement the steps of any ranging method provided by the examples of the present disclosure.

According to a fourth aspect of the examples of the present disclosure, a ranging device is provided. The device includes: a processor, a communication interface, a storage medium and a communication bus;
wherein the processor, the communication interface, and the storage medium communicate with one another through the communication bus;
the storage medium is configured to store a computer program;
the processor is configured to execute the computer program stored on the storage medium to implement the steps of any ranging method provided by the examples of the present disclosure.

According to a fifth aspect of the embodiments of the present disclosure, a computer-readable storage medium is provided. The computer-readable storage medium stores a computer program, and the computer program is executed by a processor to implement the steps of any ranging method provided by the examples of the present disclosure.

As can be seen from the above examples, a video image and a radar signal set that are collected respectively by a camera and radar at the same time are acquired, position information corresponding to each target object in the video image is determined, and a ranging algorithm is determined based on the position information corresponding to the target objects that have matched radar signals and the radar signals matching the target objects. Then, for a target object that does not match a radar signal, according to the ranging algorithm and the position information corresponding to the target object that does not match a radar signal, the distance between the target object that does not match a radar signal and the designated vehicle can be calculated. Since the above-mentioned ranging algorithm is dynamically calculated from known radar signals and position information corresponding to the target objects matching these radar signals, the ranging algorithm can adapt to changes in roads and has high ranging accuracy. Then, for a target object that does not match a radar signal, the distance between the target object and the designated vehicle can be measured through the ranging algorithm. It can be seen that through this kind of processing, a more comprehensive and accurate measurement of the distance between a front obstacle and a vehicle can be achieved.

DETAILED DESCRIPTION OF THE EXAMPLES

Figure 1:
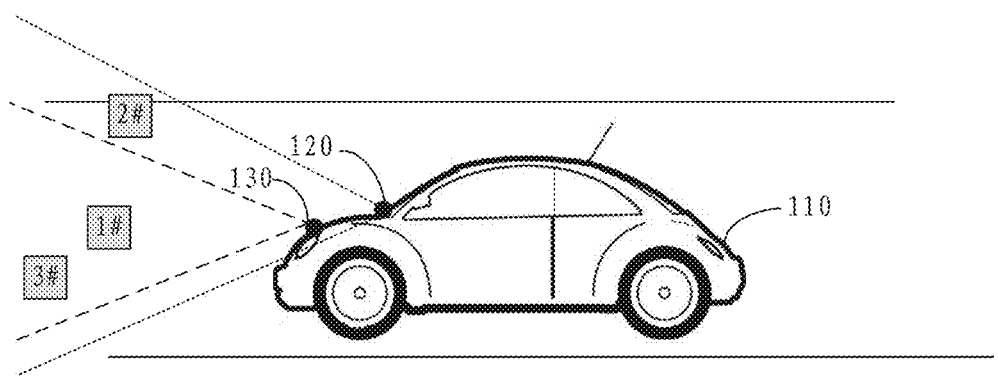
FIG. 1 is a schematic diagram of an application scenario for implementing a ranging method according to an exemplary example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

Referring to FIG. 1, which is a schematic diagram of an application scenario of a ranging method according to an exemplary example of the present disclosure. As shown in FIG. 1, included are a vehicle 110, a camera 120, radar 130, an obstacle 1 #, an obstacle 2 #, and an obstacle 3 #. The camera 120 may be a monocular camera and is arranged at the front glass windshield of the vehicle 110. The radar 130 may be a millimeter wave radar, which is arranged at the front cover of the vehicle 110, and the obstacles 1 #~3 # are located in front of the vehicle 110, and may be vehicles or other obstacles that may prevent the vehicle 110 from traveling.

The radar 130 generates sufficient electromagnetic energy through an internal transmitter thereof (not shown in FIG. 1), and transmits the electromagnetic energy to the antenna (not shown in FIG. 1) via a transceiver switch (not shown in FIG. 1), the antenna radiates the electromagnetic energy into the atmosphere, to make it to be concentrated in a certain detection range (the range indicated by a sparse dotted line in FIG. 1) to form a wave beam and propagate forward. After an electromagnetic wave encounters a radar target in this direction and within the range, the electromagnetic wave will be reflected in all directions, and a part of the electromagnetic energy is reflected back to the orientation where the radar 130 is located and acquired by the antenna. The electromagnetic energy acquired by the antenna is transmitted to a receiver (not shown in FIG. 1) inside the radar 130 via a transceiver switch, and forms a radar signal. Further, a signal processor (not shown in FIG. 1) inside the radar 130 performs processing such as amplification and denoising on the radar signal to extract information such as the distance, direction, and speed of the radar target.

The camera 120 can collect video images within a certain viewing angle range (such as the range indicated by a thick dotted line in FIG. 1), and the video image is subjected to a series of processes such as foreground analysis, feature extraction, and depth calculation through machine vision technology, such as monocular ranging technology, to obtain a distance between a target object (such as the obstacles 1 #-3 # shown in FIG. 1) in front of the vehicle 110 and the vehicle 110.

It can be seen from the above description that although the distance measurement can be achieved only by the radar 130, since the detection range of the radar 130 is limited, it is easy to cause missed detection of an obstacle in front of the vehicle 110. For example, the obstacle 2 # illustrated in FIG. 1 does not fall within the detection range of the radar 130, so the radar signal of the obstacle 2 # cannot be detected. Moreover, since the radar signal is susceptible to interference, it is easy to cause false detection of the distance between the vehicle 110 and the front obstacle. If the distance is measured only by the camera 120, the accuracy of the ranging is likely to be low in that distance calculation models (such as a monocular ranging model) are mostly implemented based on hypothetical ideal situations, for example, assuming that the side lines of a road are parallel to each other, assuming that the car body is running parallel to the road side line, assuming that the road is flat without bumps, and assuming that there is no camera lens distortion, etc. However, the actual scene is complex and diverse, and often deviates from the ideal situation.

In view of the above, an example of the present disclosure proposes a ranging method to achieve a more comprehensive and accurate measurement of the distance between a vehicle and a front obstacle.

Based on the application scenario illustrated in FIG. 1, in the ranging method of the example of the present disclosure, internal parameters of the camera 120 may be first calibrated, including: a scaling factor $f_x$ of the camera 120 in a u-axis direction of an image coordinate system, a scaling factor $f_y$ in the v-axis direction, a coordinate value $c_x$ of a principal point of the camera 120 in the u-axis direction of the image coordinate system, and a coordinate value $c_y$ in the v-axis direction. The internal parameters calibration method may employ, for example, the "Zhang Zhengyou calibration (also known as Zhang's calibration)" method.

Figure 2:
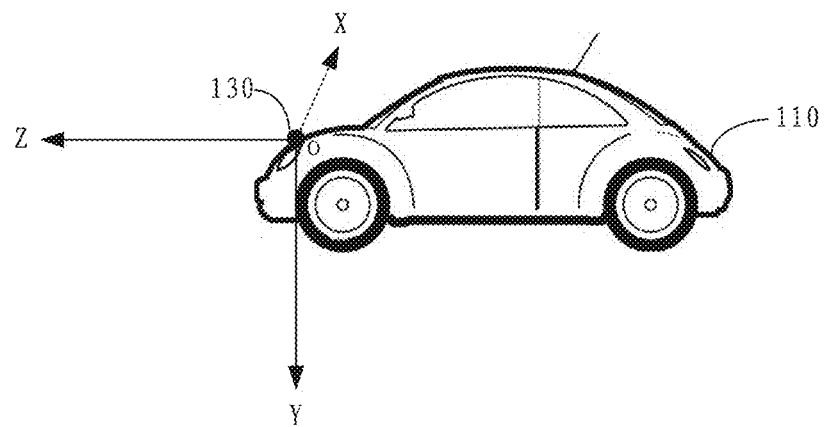
FIG. 2 shows an example of a calibrated radar coordinate system.

In addition, in this method, the installation position of the radar 130 can also be calibrated with a goniometer. The calibration result is that the ZOX plane of the radar coordinate system is parallel to the road surface, and the ZOY plane is parallel to the longitudinal section of the vehicle 110, as shown in an example of the calibrated radar coordinate system illustrated in FIG. 2. The radar coordinate system shown in FIG. 2 takes the mass point of the radar 130 as the coordinate origin, the direction pointing to the head of the vehicle as the positive direction of the Z axis, the direction perpendicular to the ground and pointing to the underground as the positive direction of the Y axis, and the direction pointing to the right side of the driver as the positive direction of the X axis. Further, the positive direction of the X-axis pointing to the right side of the driver may be parallel to the ground surface.

In this method, external parameters of the camera 120 can also be calibrated, including: a reference pitch angle $\theta_{rcc}$ of the radar 130 relative to the camera 120 in the 0 camera coordinate system, a displacement $y_{rcc}$ relative to the camera 120 in the Y-axis direction of the camera coordinate system, a displacement $z_{rcc}$ relative to the camera 120 in the Z-axis direction of the camera coordinate system, and a displacement $y_{prc}$ of the road relative to the radar 130 in the Y-axis direction of the camera coordinate system.

Figure 3:
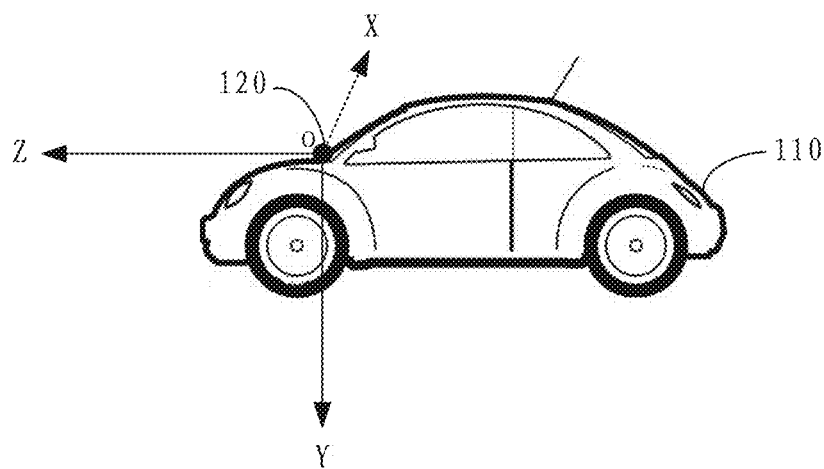
FIG. 3 shows an example of a camera coordinate system.

The above camera coordinate system takes the focal point of the camera 120 as the coordinate origin, the direction pointing to the head of the vehicle as the positive direction of the Z axis, the direction perpendicular to the ground and pointing to the underground as the positive direction of the Y axis, and the direction pointing to the right side of the driver as the positive direction of the X axis. As shown in FIG. 3, which is an example of a camera coordinate system, the positive direction of the X-axis pointing to the right side of the driver can also be parallel to the ground surface.

In the example of the present disclosure, for the convenience of description, the above-mentioned internal and external parameters are collectively referred to as the configuration parameters of the camera 120, and the specific process for calibrating the internal and external parameters of the camera 120 will not be described in detail in the example of the present disclosure.

The ranging method proposed in the example of the present disclosure is described as follows.

EXAMPLE I

Figure 4:
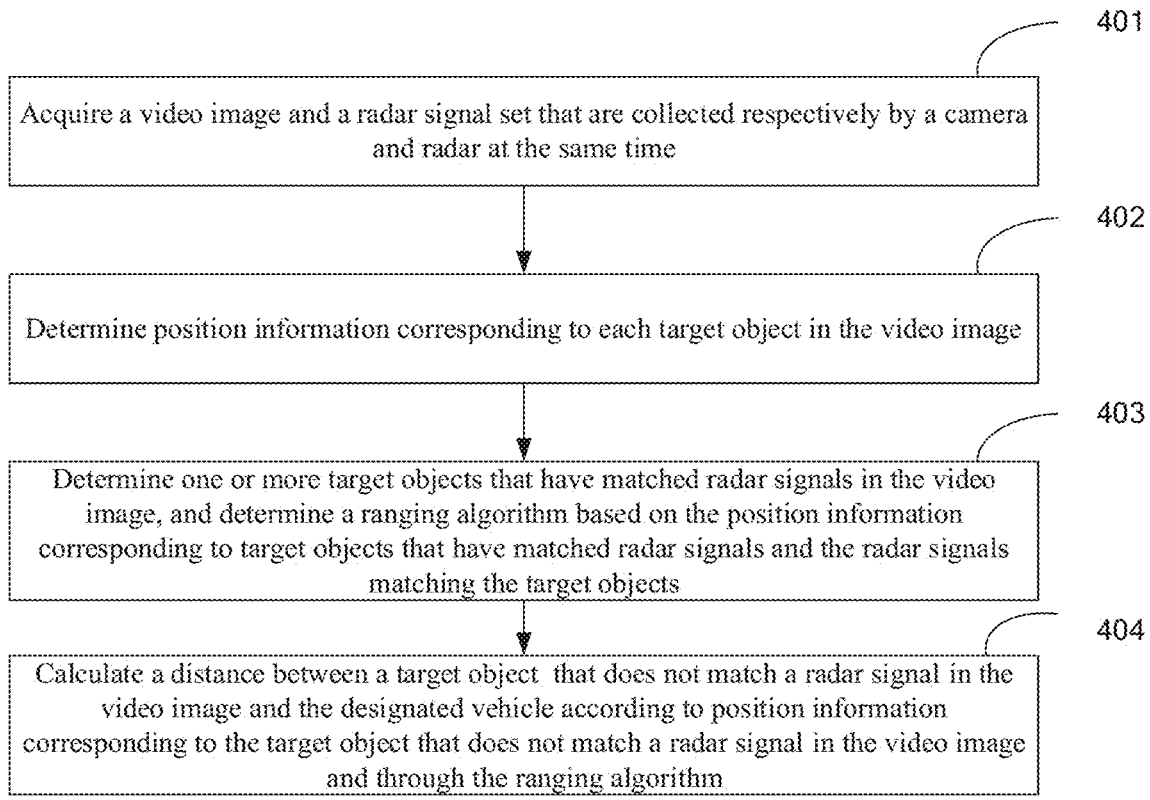
FIG. 4 is a flowchart of an example of a ranging method according to an exemplary example of the present disclosure.

Referring to FIG. 4, which is a flowchart of an example of a ranging method according to an exemplary example of the present disclosure. The method may include the following blocks.

At block 401, a video image and a radar signal set that are collected respectively by a camera and radar at the same time are acquired.

In the example of the present disclosure, based on the application scenario illustrated in FIG. 1, the vehicle 110 may be referred to as a designated vehicle. Then, in this block, it is possible to acquire a radar signal set and a video image that are collected respectively by the radar 130 and the camera 120 installed on the vehicle 110 at the same time. The radar signal set includes radar signals of at least one radar target.

At block 402, position information corresponding to each target object in the video image is determined.

Figure 5:
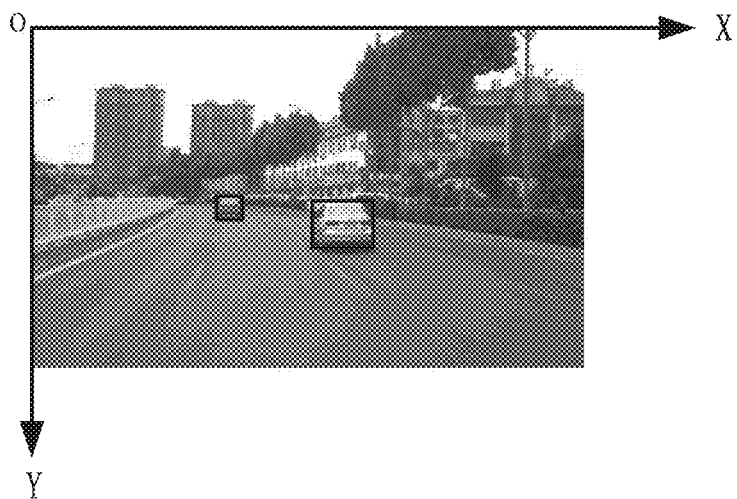
FIG. 5 is an example of a video image.

In the example of the present disclosure, a machine learning algorithm may be used to detect a target object in the video image collected in block 401 and obtain the position of the target object in the video image. For example, in the video image as shown in FIG. 5, the type of the target object is a vehicle, and the two solid black rectangular boxes in FIG. 5 indicate the position of the target object in the video image.

Based on the application scenario shown in FIG. 1, the obstacles 1 #~3 # are all located within the viewing angle range of the camera 120. Therefore, in this block, three target objects and the respective positions of the three target objects in the video image can be detected in the video image collected in block 401.

In an example, the position of the target object in the video image is represented by a bounding rectangle of the target object. For the bounding rectangle of each target object, the Y-axis coordinate value of the bottom border of the bounding rectangle in the image coordinate system can be determined. The Y-axis coordinate value can be used as the corresponding position information of the target object in the video image, denoted as P. The image coordinate system takes the upper left vertex of the video image as the coordinate origin, the horizontal direction to the right is the positive direction of the X axis, and the vertical downward direction is the positive direction of the Y axis, for example, as shown in FIG. 5.

Those skilled in the art can understand that in the above description, taking the Y-axis coordinate value of the bottom border of the bounding rectangle of the target object in the image coordinate system as the corresponding position information of the target object in the video image is merely an example, and in practical application, other parameters, such as the Y-axis coordinate value of the top border of the bounding rectangle of the target object in the image coordinate system, or the X-axis coordinate value of the left (or right) border of the bounding rectangle of the target object in the image coordinate system can be taken as the position information of the target object in the video image, which is not limited in the example of the present disclosure.

The specific process of detecting a target object in a video image and obtain an bounding rectangle of the target object in the video image with a machine learning algorithm will not be described in detail in the example of the present disclosure.

At block 403, one or more target objects that have matched radar signals in the video image are determined, and a ranging algorithm is determined based on the position information corresponding to the target objects that have matched radar signals and the radar signals matching the target objects.

In the example of the present disclosure, for each target object in the video image, a radar signal matching the target object may be found in the radar signal set described in block 401. The matching mentioned here means that if the radar target detected by the radar signal is the target object, the target object matches the radar signal. A specific implementation of matching may be that a video area of a target object in a video image overlaps with a projection area of a radar target corresponding to a radar signal matching the target object on the video image.

In the example of the present disclosure, determining one or more target objects that have matched radar signals in the video image includes:

for the target object, searching in the radar signal set for a radar signal having a projection area overlapping with the video area corresponding to the target object in the video image, where the projection area is the projection area of the radar target detected by the radar signal in the video image; if a radar signal of which a projection area overlaps with the video area of the target object is found, it is determined that the target object matches the radar signal.

For example, in the application scenario shown in FIG. 1, the radar 130 can collect radar signals from two radar targets, assumingly a radar signal A and a radar signal B, respectively. Three target objects can be detected in the video image collected by camera 120, respectively, an obstacle 1 #, an obstacle 2 #, and an obstacle 3 #. Therefore, in this block, for each of the three target objects, a matching radar signal is searched in the two radar signals, and the final matching result can be shown in Table 1 below.

TABLE 1

| Radar Signal | Target Object |
| --- | --- |
| Signal A | Obstacle 1# |
| Signal B | Obstacle 3# |

As can be seen from Table 1 above, for the two target objects obstacle 1 # and obstacle 3 #, matching radar signals have been determined, and for the target object of obstacle 2 #, no matching radar signal has been determined.

The specific process of searching a radar signal matching a target object in the radar signal set described in block 401 will not be described in detail in this example of the present disclosure.

Subsequently, in the example of the present disclosure, a ranging algorithm may be determined based on the position information corresponding to target objects that have matched radar signals and the radar signals matching the target objects. In an example, the ranging algorithm may be embodied in a form of a monocular ranging model. For example, as shown in the following formula (1), it is an example of the monocular ranging model:

$$D_v = \frac{\left(y_{rcc}f_y + y_{prc}\frac{f_y}{\cos\theta_{rcc}} + c_y z_{rcc} - p z_{rcc}\right)}{p\cos(\theta_{rcc} + \theta_{pp})} - \quad \text{Formula (1)}$$

$$f_y \sin(\theta_{rcc} + \theta_{pp}) - c_y \cos(\theta_{rcc} + \theta_{pp}))$$

In the above formula (1), $\theta_{pp}$ denotes a pitch angle of a road, which can be calculated through the following formula (2):

$$\theta_{pp} = \operatorname{argmin}\theta_{pp} \sum_{i=1}^{i=n}(D_{v,i} - f(p_i|\theta_{pp}))^2 u_{dis,i} \quad \text{Formula (2)}$$

In the above formula (2), n denotes a number of target objects that have matched radar signals, and $D_{v,i}$ denotes distance information between the i-th target object that has matched a radar signal and the designated vehicle. It could be understood by those skilled in the art that the distance information can be obtained from the radar signal matching the i-th target object that has matched the radar signal, and $u_{dis,i}$ denotes a confidence level of the radar signal matching the i-th target object that has matched the radar signal, $u_{dis,i}$ can be calculated through the following formula (3):

$$u_{dis,i} = k_{dis} E_{target,i} \quad \text{Formula (3)}$$

In the above formula (3), $k_{dis}$ denotes a confidence coefficient, and $E_{target,i}$ denotes a signal strength of the radar signal matching the i-th target object that has matched the radar signal.

As can be seen from the above formula (1), the monocular ranging model in the example of the present disclosure takes the position information p of a target object in the video image as an independent variable, that is, an input, and takes a distance $D_{v,i}$ between the target object and the designated vehicle as a dependent variable, that is, an output. The specific process of determining the monocular ranging model shown in the above formula (1) according to the position information corresponding to the target objects that have matched radar signals and the radar signals matching the target objects may refer to the detailed description of the following second example, and will not be described in detail here in the present example of the present disclosure At block 404, a distance between a target object in the video image that does not match a radar signal and the designated vehicle is calculated according to position information corresponding to the target object in the video image that does not match a radar signal and through the ranging algorithm.

In the example of the present disclosure, for a target object in the video image that does not match a radar signal, a distance between the target object and the vehicle 110 can be calculated according to the position information corresponding to the target object and the monocular ranging model shown in the above formula (1), i.e., the ranging algorithm.

As can be seen from the above examples, a video image and a radar signal set that are collected respectively by a camera and radar at the same time are acquired, position information corresponding to each target object in the video image is determined, and a ranging algorithm is determined based on the position information corresponding to the target objects that have matched radar signals in the video image and the radar signals matching the target objects. Then, for a target object that does not match a radar signal, according to the ranging algorithm and the position information corresponding to the target object that does not match a radar signal, the distance between the target object that does not match a radar signal and the designated vehicle can be calculated. Since the above-mentioned ranging algorithm is dynamically calculated from known radar signals and position information corresponding to the target objects matching these radar signals, the ranging algorithm can adapt to changes in roads and has high ranging accuracy. Then, for a target object that does not match a radar signal, the distance between the target object and the designated vehicle can be measured through the ranging algorithm. It can be seen that through this kind of processing, a more comprehensive and accurate measurement of the distance between a front obstacle and a vehicle can be achieved.

The designated vehicle can be one or more vehicles in the video image.

EXAMPLE II

Figure 6:
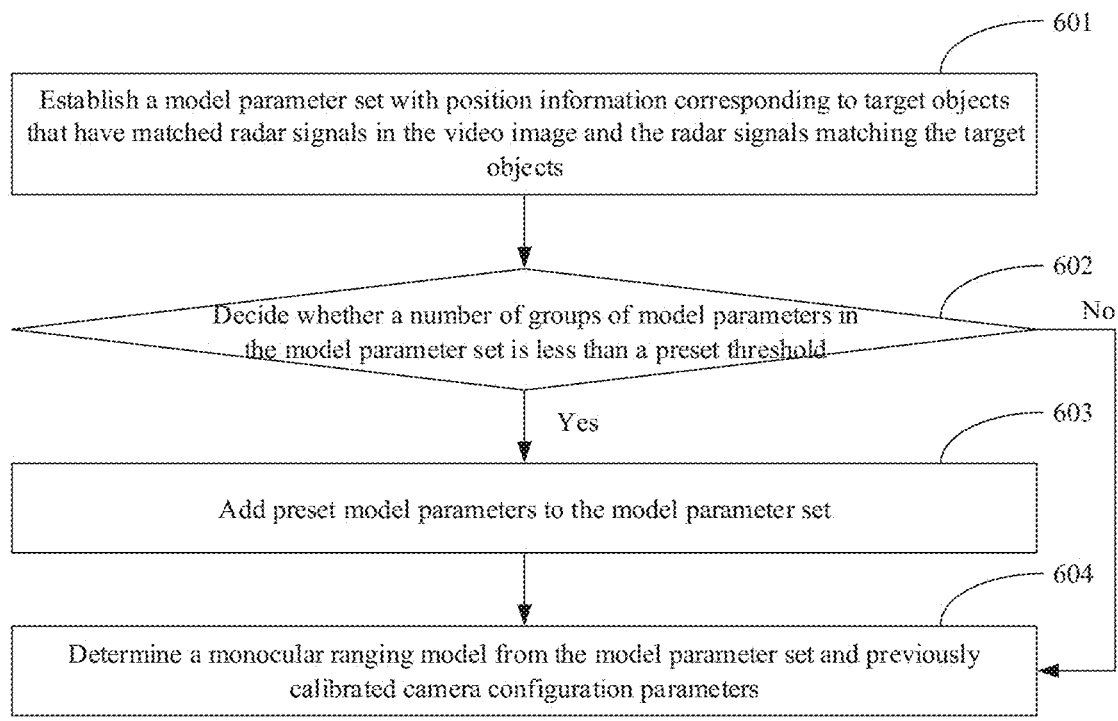
FIG. 6 is a flowchart of another example of a ranging method according to an exemplary example of the present disclosure.

Referring to FIG. 6, which is a flowchart of another example of a ranging method according to an exemplary example of the present disclosure. The method may include the following blocks.

At block 601, a model parameter set is established with position information corresponding to target objects that have matched radar signals in the video image and the radar signals matching the target objects.

In this block, a confidence level of a radar signal matching each target object that matches a radar signal in the video image may be determined according to the formula (3) in the first example.

In the example of the present disclosure, a group of model parameters may be established for each target object in the video image that matches a radar signal, and the model parameters include position information of the target object and distance information in the matching radar signal, and a confidence level of the matching radar signal.

Each group of model parameters are added to the model parameter set.

At block 602, it is decided whether a number of groups of model parameters in the model parameter set is less than a preset threshold; if so, block 603 is performed; otherwise, block 604 is performed.

At block 603, preset model parameters are added to the model parameter set.

In the example of the present disclosure, in order to prevent an over-fitting phenomenon during the determination of the monocular ranging model which would reduce the accuracy of the monocular ranging model, it may be decided whether the number of groups of model parameters in the model parameter set is less than a preset threshold, if so, a group of preset model parameters can be added to the model parameter set. The preset model parameters include: a preset confidence level, preset distance information, and preset position information. The preset position information can be obtained by setting the pitch angle of the road to 0 in the above formula (1), and according to the preset distance information. The preset distance information may specifically be a preset distance value.

At block 604, a monocular ranging model is determined from the model parameter set and previously calibrated camera configuration parameters.

In this block, each group of model parameters in the model parameter set and the formula (2) in the first example described above can be used to fit the pitch angle of the road.

Subsequently, the monocular ranging model illustrated in the formula (1) in the first example is determined from the pitch angle of the road and previously calibrated camera configuration parameters.

It should be noted that the monocular ranging model mentioned in some optional examples of the present application essentially refers to implementing ranging based on a video image, and does not mean strictly based on a video image collected by one specific camera. For example, two types of cameras can be installed on the vehicle, respectively an infrared camera and an ordinary surveillance camera. In daytime driving scenarios, the ordinary surveillance camera can be enabled to collect video images. In nighttime driving scenarios, the infrared camera can be enabled to collect video images to improve the clarity of the video images.

It can be seen from the above examples that a model parameter set is established with position information corresponding to target objects that have matched radar signals in the video image and the radar signals matching the target objects, and a monocular ranging model is determined from the model parameter set and previously calibrated camera configuration parameters. It can make the determined monocular ranging model have higher ranging accuracy.

Corresponding to the above examples of the ranging method, an example of the present disclosure also provides an example of a ranging device.

Figure 7:
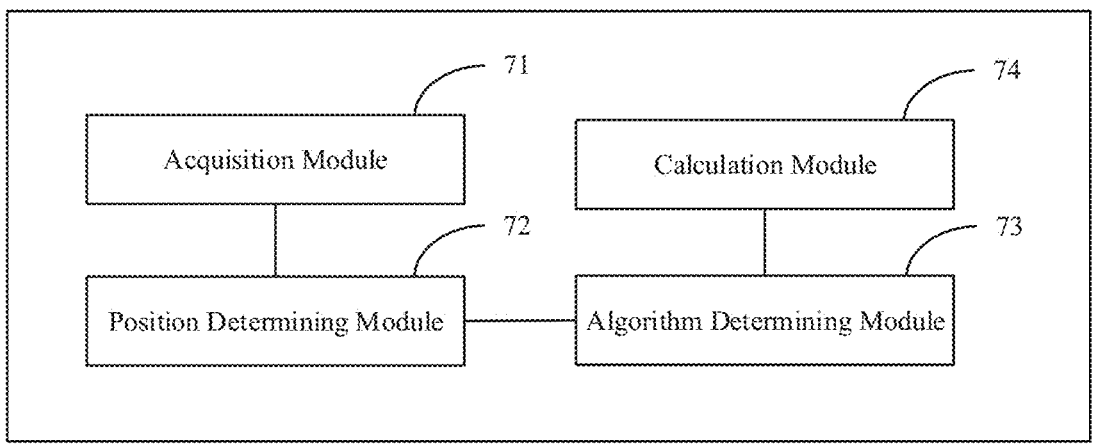
FIG. 7 is a block diagram of an example of a ranging device according to an exemplary example of the present disclosure.

Referring to FIG. 7, which is a block diagram of a ranging device according to an exemplary example of the present disclosure. The device may include: an acquisition module 71, a position determining module 72, an algorithm determining module 73, and a calculation module 74.

The acquisition module 71 may be configured to acquire a video image and a radar signal set that are collected respectively by a camera and radar at the same time;
the position determining module 72 may be configured to determine position information corresponding to each target object in the video image;
the algorithm determining module 73 may be configured to determine one or more target objects that have matched radar signals in the video image, and determine a ranging algorithm based on the position information corresponding to the target objects that have matched radar signals and the radar signals matching the target objects; and the calculation module 74 may be configured to calculate a distance between a target object that does not match a radar signal in the video image and the designated vehicle according to position information corresponding to the target object that does not match a radar signal in the video image and through the ranging algorithm.

In an example, the position information corresponding to the target object includes a Y-axis coordinate value of the target object in an image coordinate system of the video image.

In an example, a video area of a target object in the video image overlaps with a projection area of a radar target corresponding to a radar signal matching the target object in the video image.

In an example, the algorithm determining module 73 may include (not shown in FIG. 7):
an establishing sub-module, which may be configured to establish a model parameter set with the position information corresponding to the target objects that have matched radar signals in the video image and the radar signals matching the target objects; and
a processing sub-module, which may be configured to determine a monocular ranging model from the model parameter set and previously calibrated configuration parameters of the camera, where the monocular ranging model takes position information corresponding to a target object as an input, and a distance between the target object and the designated vehicle as an output.

In an example, the establishing sub-module may include (not shown in FIG. 7):
a confidence determining sub-module, which may be configured to determine a confidence level of a radar signal matching each target object that has matched a radar signal in the video image; and
an adding sub-module, which may be configured to add position information corresponding to each target object that has matched a radar signal, distance information in the matching radar signal, and the confidence level of the matching radar signal as a group of model parameters to the model parameter set.

In an example, the processing sub-module may include (not shown in FIG. 7):
a pitch angle fitting sub-module configured to fit a pitch angle of a road with each group of model parameters in the model parameter set, and
a model determining sub-module configured to determine a monocular ranging model with the pitch angle of the road and previously calibrated configuration parameters of the camera.

In an example, the device may further include (not shown in FIG. 7):
a deciding module, which may be configured to decide whether a number of groups of model parameters in the model parameter set is less than a preset threshold; and
an additional module, which may be configured to add preset model parameters to the model parameter set if the number of groups of model parameters in the model parameter set is less than the preset threshold.

For details about the implementation process of the functions and effects of each unit in the above device, reference can be made to the implementation process of corresponding blocks in the above method for details, which will are not be repeated herein.

As for the device example, since it basically corresponds to the method example, the relevant part may refer to the description of the method example. The device examples described above are only schematic, and the units described as separate components may or may not be physically separated, and the components displayed as units may or may not be physical units, that is, may be located at one place, or it can be distributed across multiple network elements. Some or all of the modules can be selected according to actual needs to achieve the objectives of the solution of the present disclosure. Those of ordinary skill in the art can understand and implement without creative efforts.

Figure 8:
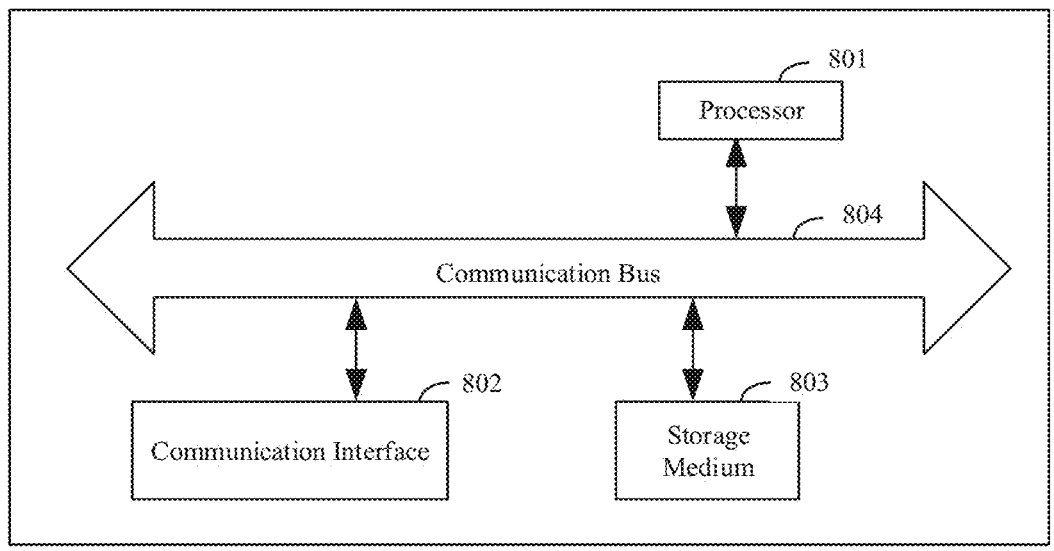
FIG. 8 is a block diagram of hardware structure of a ranging device provided by the present disclosure.

Still referring to FIG. 8, an example of the present disclosure further provides a ranging device, including a processor 801, a communication interface 802, a storage medium 803, and a communication bus 804.

The processor 801, the communication interface 802, and the storage medium 803 communicate with one another through the communication bus 804.

The storage medium 803 is configured to store a computer program; and

The processor 801 is configured to execute the computer program stored on a storage medium 803 to implement steps of any ranging method provided by the present disclosure.

An example of the present disclosure also provides a computer-readable storage medium having stored thereon a computer program that, when being executed by a processor, implements steps of any ranging method provided by the present disclosure.

An example of the present disclosure further provides a ranging system. The ranging system includes:

radar, which can be configured to collect radar signal sets;

a camera, which can be configured to collect a video image;

a storage medium, which can be configured to store a computer program; and a processor configured to execute the computer program stored on the storage medium to implement the steps of any ranging method provided by the present disclosure.

The above are only preferred examples of the present disclosure, and are not intended to limit the present disclosure. Any modification, equivalent replacement, or improvement made within the spirit and principles of the present disclosure shall include within the scope of the present disclosure.

The invention claimed is:

1. A method, comprising:
acquiring a video image and a radar signal set that are collected respectively by a camera and a radar at a same time;
determining position information corresponding to each target object in the video image;
determining one or more target objects that have matched radar signals in the video image;
determining a ranging algorithm based on position information corresponding to the one or more target objects that have matched radar signals and the radar signals matching the one or more target objects; and
calculating a distance between a target object having a mismatched radar signal in the video image and a designated vehicle according to position information corresponding to the target object having the mismatched radar signal in the video image and through the ranging algorithm,
wherein determining the one or more target objects that have matched radar signals in the video image comprises:
in response to determining that a video area of each target object of the one or more target objects in the video image overlaps with a projection area of a radar target in the video image, determining that the target object matches a radar signal corresponding to the radar target,
wherein the ranging algorithm comprises a monocular ranging model with a formula:

$$D_v = \frac{\left(y_{rcc}f_y + y_{prc}\frac{f_y}{\cos\theta_{rcc}} + c_y z_{rcc} - p z_{rcc}\right)}{p\cos(\theta_{rcc} + \theta_{pp})} - f_y\sin(\theta_{rcc} + \theta_{pp}) - c_y\cos(\theta_{rcc} + \theta_{pp})),$$

where $D_v$ denotes distance information, $f_y$ denotes a scaling factor of the camera in a v-axis direction of an image coordinate system, $c_y$ denotes a coordinate value of a principal point of the camera in a v-axis direction of the image coordinate system, $\theta_{rcc}$ denotes a reference pitch angle of the radar relative to the camera in a camera coordinate system, $y_{rcc}$ denotes a displacement relative to the camera in a Y-axis direction of the camera coordinate system, $z_{rcc}$ denotes a displacement relative to the camera in a Z-axis direction of the camera coordinate system, $y_{prc}$ denotes a displacement of a road relative to the radar in the Y-axis direction of the camera coordinate system, $\theta_{pp}$ denotes a pitch angle of the road, and p denotes corresponding position information of the target object in the video image.

2. The method according to claim 1, wherein the position information corresponding to each target object in the video image comprises a Y-axis coordinate value of the target object in the image coordinate system of the video image.

3. The method according to claim 1, wherein determining the ranging algorithm based on the position information corresponding to the one or more target objects that have matched radar signals and the radar signals matching the one or more target objects comprises:
establishing a model parameter set with the position information corresponding to the one or more target objects that have matched radar signals and the radar signals matching the one or more target objects, wherein the model parameter set at least includes position information of each of the one or more target objects, distance information in a radar signal matching with a corresponding target object, and a confidence level of a matched radar signal; and
determining the monocular ranging model from the model parameter set and previously calibrated configuration parameters of the camera, wherein the monocular ranging model takes position information corresponding to a target object as an input and a distance between the target object and the designated vehicle as an output.

4. The method according to claim 3, wherein establishing the model parameter set with the position information corresponding to the one or more target objects that have matched radar signals and the radar signals matching the one or more target objects comprises:
determining a confidence level of a respective radar signal matching each target object that has matched the respective radar signal in the video image; and
adding position information corresponding to each target object that has matched the respective radar signal, distance information in the respective radar signal, and the confidence level of the respective radar signal as a group of model parameters to the model parameter set.

5. The method according to claim 3, wherein determining the monocular ranging model from the model parameter set and the previously calibrated configuration parameters of the camera comprises:
fitting a pitch angle of a road with each group of model parameters in the model parameter set; and
determining the monocular ranging model with the pitch angle of the road and the previously calibrated configuration parameters of the camera.

6. The method according to claim 3, wherein, before determining the monocular ranging model from the model parameter set and the previously calibrated configuration parameters of the camera, the method further comprises:
  determining whether a number of groups of model parameters in the model parameter set is less than a preset threshold; and
  adding preset model parameters to the model parameter set in response to determining that the number of groups of model parameters in the model parameter set is less than the preset threshold.

7. A system, comprising:
  a radar configured to collect radar signal sets;
  a camera configured to collect a video image;
  at least one processor; and
  at least one storage medium configured to store a computer program for execution by the at least one processor to perform operations comprising:
    acquiring a video image and a radar signal set that are collected respectively by the camera and the radar at a same time;
    determining position information corresponding to each target object in the video image;
    determining one or more target objects that have matched radar signals in the video image;
    determining a ranging algorithm based on position information corresponding to the one or more target objects that have matched radar signals and the radar signals matching the one or more target objects; and
    calculating a distance between a target object having a mismatched radar signal in the video image and a designated vehicle according to position information corresponding to the target object having the mismatched radar signal in the video image and through the ranging algorithm,
    wherein determining one or more target objects that have matched radar signals in the video image comprises:
      in response to determining that a video area of each target object of the one or more target objects in the video image overlaps with a projection area of a radar target in the video image, determining that the target object matches a radar signal corresponding to the radar target,
    wherein the ranging algorithm comprises a monocular ranging model with a formula:

$$D_v = \frac{\left(y_{rcc}f_y + y_{prc}\frac{f_y}{\cos\theta_{rcc}} + c_y z_{rcc} - p z_{rcc}\right)}{p\cos(\theta_{rcc} + \theta_{pp})} -$$

$$f_y \sin(\theta_{rcc} + \theta_{pp}) - c_y \cos(\theta_{rcc} + \theta_{pp})),$$

where $D_v$ denotes distance information, $f_y$ denotes a scaling factor of the camera in a v-axis direction of an image coordinate system, $c_y$ denotes a coordinate value of a principal point of the camera in a v-axis direction of the image coordinate system, $\theta_{rcc}$ denotes a reference pitch angle of the radar relative to the camera in a camera coordinate system, $y_{rcc}$ denotes a displacement relative to the camera in a Y-axis direction of the camera coordinate system, $z_{rcc}$ denotes a displacement relative to the camera in a Z-axis direction of the camera coordinate system, $y_{prc}$ denotes a displacement of a road relative to the radar in the Y-axis direction of the camera coordinate system, $\theta_{pp}$ denotes a pitch angle of the road, and p denotes corresponding position information of the target object in the video image.

8. The system according to claim 7, wherein the position information corresponding to each target object in the video image comprises a Y-axis coordinate value of the target object in the image coordinate system of the video image.

9. The system according to claim 7, wherein determining the ranging algorithm based on the position information corresponding to the one or more target objects that have matched radar signals and the radar signals matching the one or more target objects comprises:
  establish a model parameter set with the position information corresponding to the target objects that have matched radar signals and the radar signals matching the target objects, wherein the model parameter set at least includes position information of each of the one or more target objects, distance information in a radar signal matching with a corresponding target object, and a confidence level of a matched radar signal; and
  determine the monocular ranging model from the model parameter set and previously calibrated configuration parameters of the camera, wherein the monocular ranging model takes position information corresponding to a target object as an input and a distance between the target object and the designated vehicle as an output.

10. The system according to claim 9, wherein establishing the model parameter set with the position information corresponding to the one or more target objects that have matched radar signals and the radar signals matching the one or more target objects comprises:
  determining a confidence level of a respective radar signal matching each target object that has matched the respective radar signal in the video image; and
  adding position information corresponding to each target object that has matched the respective radar signal, distance information in the respective radar signal, and the confidence level of the respective radar signal as a group of model parameters to the model parameter set.

11. The system according to claim 9, wherein determining the monocular ranging model from the model parameter set and the previously calibrated configuration parameters of the camera comprises:
  fitting a pitch angle of a road with each group of model parameters in the model parameter set; and
  determining the monocular ranging model with the pitch angle of the road and the previously calibrated configuration parameters of the camera.

12. A device, comprising:
  at least one processor; and
  at least one non-transitory storage medium storing machine-executable instructions,
  for execution by the at least one processor to perform operations comprising:
    acquiring a video image and a radar signal set that are collected respectively by a camera and a radar at a same time;
    determining position information corresponding to each target object in the video image;
    determining one or more target objects that have matched radar signals in the video image;
    determining a ranging algorithm based on position information corresponding to the one or more target objects that have matched radar signals and the radar signals matching the one or more target objects; and
    calculating a distance between a target object having a mismatched radar signal in the video image and a designated vehicle according to position information corresponding to the target object having the mismatched radar signal in the video image and through the ranging algorithm, wherein determining one or more target objects that have matched radar signals in the video image comprises:
  in response to determining that a video area of each target object of the one or more target objects in the video image overlaps with a projection area of a radar target in the video image, determining that the target object matches a radar signal corresponding to the radar target, wherein the ranging algorithm comprises a monocular ranging model with a formula:

$$D_v = \frac{\left(y_{rcc}f_y + y_{prc}\dfrac{f_y}{\cos\theta_{rcc}} + c_y z_{rcc} - pz_{rcc}\right)}{p\cos(\theta_{rcc} + \theta_{pp})} - f_y\sin(\theta_{rcc} + \theta_{pp}) - c_y\cos(\theta_{rcc} + \theta_{pp})),$$

where $D_v$ denotes distance information, $f_y$ denotes a scaling factor of the camera in a v-axis direction of an image coordinate system, $c_y$ denotes a coordinate value of a principal point of the camera in a v-axis direction of the image coordinate system, $\theta_{rcc}$ denotes a reference pitch angle of the radar relative to the camera in a camera coordinate system, $y_{rcc}$ denotes a displacement relative to the camera in a Y-axis direction of the camera coordinate system, $z_{rcc}$ denotes a displacement relative to the camera in a Z-axis direction of the camera coordinate system, $y_{prc}$ denotes a displacement of a road relative to the radar in the Y-axis direction of the camera coordinate system, $\theta_{pp}$ denotes a pitch angle of the road, and p denotes corresponding position information of the target object in the video image.

13. The device according to claim 12, wherein the position information corresponding to each target object in the video image comprises a Y-axis coordinate value of the target object in the image coordinate system of the video image.

14. The device according to claim 12, wherein determining the ranging algorithm based on the position information corresponding to the one or more target objects that have matched radar signals and the radar signals matching the one or more target objects comprises:
  establish a model parameter set with the position information corresponding to the target objects that have matched radar signals and the radar signals matching the target objects, wherein the model parameter set at least includes position information of each of the one or more target objects, distance information in a radar signal matching with a corresponding target object, and a confidence level of a matched radar signal; and
  determine the monocular ranging model from the model parameter set and previously calibrated configuration parameters of the camera, wherein the monocular ranging model takes position information corresponding to a target object as an input and a distance between the target object and the designated vehicle as an output.

15. The device according to claim 14, wherein establishing the model parameter set with the position information corresponding to the one or more target objects that have matched radar signals and the radar signals matching the one or more target objects comprises:
  determining a confidence level of a respective radar signal matching each target object that has matched the respective radar signal in the video image; and
  adding position information corresponding to each target object that has matched the respective radar signal, distance information in the respective radar signal, and the confidence level of the respective radar signal as a group of model parameters to the model parameter set.

16. The device according to claim 14, wherein determining the monocular ranging model from the model parameter set and the previously calibrated configuration parameters of the camera comprises:
  fitting a pitch angle of a road with each group of model parameters in the model parameter set; and
  determining the monocular ranging model with the pitch angle of the road and the previously calibrated configuration parameters of the camera.

17. The device according to claim 14, wherein, before determining the monocular ranging model from the model parameter set and previously calibrated configuration parameters of the camera, the operations further comprise:
  determining whether a number of groups of model parameters in the model parameter set is less than a preset threshold; and
  adding preset model parameters to the model parameter set in response to determining that the number of groups of model parameters in the model parameter set is less than the preset threshold.

* * * * *